United States Patent [19]

Musson et al.

[11] Patent Number: 4,894,250

[45] Date of Patent: Jan. 16, 1990

[54] THERMO-IRREVERSIBLE EDIBLE GELS OF GLUCOMANNAN AND XANTHAN GUMS

[75] Inventors: Gary D. Musson; Colin T. Prest, both of Melton Mowbray, United Kingdom

[73] Assignee: Mars G.B. Limited, Berkshire, United Kingdom

[21] Appl. No.: 190,581

[22] Filed: May 5, 1988

[30] Foreign Application Priority Data

May 6, 1987 [GB] United Kingdom ............... 8710704

[51] Int. Cl.$^4$ ............................................. A23L 1/06
[52] U.S. Cl. .................................. 426/573; 426/575; 426/574
[58] Field of Search ...................... 426/573, 575, 574

[56] References Cited

U.S. PATENT DOCUMENTS

| 4,582,714 | 4/1986 | Ford et al. ........................... 426/505 |
| 4,647,470 | 3/1987 | Sanderson et al. .................. 426/574 |
| 4,676,976 | 6/1987 | Toba et al. ........................... 426/573 |
| 4,746,528 | 5/1988 | Prest ..................................... 426/573 |

FOREIGN PATENT DOCUMENTS

| 0069591 | 1/1983 | European Pat. Off. . |
| 0185511 | 6/1986 | European Pat. Off. . |
| 2048642 | 12/1980 | United Kingdom . |
| 2084844 | 4/1982 | United Kingdom . |
| 2128871 | 5/1984 | United Kingdom . |
| 2137066 | 10/1984 | United Kingdom . |
| 2168366 | 6/1986 | United Kingdom . |

*Primary Examiner*—Jeanette Hunter
*Attorney, Agent, or Firm*—Curtis, Morris & Safford

[57] ABSTRACT

Thermo-irreversible aqueous gels are prepared by subjecting a gellable combination of xanthan gum and a glucomannan gum, preferably from the corms of an Amorphophallus species at a pH above 6 to a heat treatment under conditions of temperature and time to cause the gel to become thermo irreversible. The pH is preferably between 6 and 10 and more especially between 6 and 8. The preferred ratio of xanthan gum to glucomannan is in the range of from 5:95 to 95:5, more especially 1:10 to 10:1 and the preferred concentration of xanthan gum and glucomannan in the aqueous phase is 0.02% to 6%, more preferably 0.5 to 4%, by weight. The thermo irreversible gels of the invention, with the inclusion of food materials, such as minced meat, fruit and vegetables, simulate the texture of natural meat offals and other food structures.

13 Claims, No Drawings

THERMO-IRREVERSIBLE EDIBLE GELS OF GLUCOMANNAN AND XANTHAN GUMS

This invention relates to edible materials and more especially to a gelling system used to prepare thermo-irreversible aqueous gels which simulate the texture of natural meat offals and other food structures.

It is known that glucomannans such as those extracted from the Amorphophallus sp for example *A. riviera* interact with xanthan gum, obtained by the fermentation of *Xanthamonas campestris*, to form thermo-reversible gels.

It is also known that glucomannans can be interacted with kappa and iota carrageenans to produce thermo-reversible and thermo-irreversible gels (see GB-A-2048642 and GB-A-20-84844). Gum combinations that will produce thermo-irreversible gels are, however, rarely encountered.

This invention is based on the surprising observation that thermo-irreversible gels can be produced by interacting aqueous solutions of xanthan gum and glucomannan gum together with the application of a heat treatment process under neutral to alkaline pH conditions, i.e. at a pH value above 6, preferably between 6 and 10, more especially between 6.5 and 8.

This invention therefore provides a method for making a thermo-irreversible aqueous gel, which comprises subjecting a gellable combination of xanthan gum and a glucomannan gum at a pH above 6 to a heat treatment under conditions of temperature and time to cause the gel to become thermo-irreversible.

Other gums and gelling agents can be incorporated into this basic gel system to modify the gel texture obtained. Inclusion of food materials such as minced meat, fruit, vegetables etc., enable a wide range of thermo-irreversible food pieces to be produced with textures simulating those of their natural counterpart by judicious combination of the amounts and ratios of the gelling agents employed. Other gums and gelling agents which may be employed for textural modification include agar, carrageenan, pectin, alginate, "Gellan", guar gum etc.

Xanthan gum may be used either in its crude form containing cell debris or as a clarified alcohol precipitated grade. The clarified grade is preferred for those instances where clarity is important in the final food structure e.g. in simulating white grapes.

The glucomannan may also be used in a crude form, such as the dried ground vegetable source or in a purified form. glucomannans are found in a variety of plants but the preferred glucomannans are found in the corms of Amorphophallus species and in particular, *A. riviera* syn.Konjac, *A. oncophyllus* and *A. variablis*.

The induction of thermo-irreversibility is a function of temperature, pH, time and thermal conductivity of the material being processed. Thermal conductivity depends to a large extent on the solids content of the system. Pure aqueous systems require a far lower heat input than systems with, for example, a high proportion of meat or other solids. In general the higher the pH the shorter the time or the lower the temperature that is required to impart thermo-irreversibility. However high pH values in the finished food product render it less palatable and it is therefore preferred that the heat treatment process take place when the pH of the material being rendered heat irreversible lies between pH 6 and 8. However it is possible to use a process employing higher pH values particularly if the food material produced is subsequently to be one of several components in a canned or bottled food product, where the higher alkali levels will be substantially neutralised by the other food materials.

The preferred ratio of xanthan gum to glucomannan is in the range 5:95 to 95:5 especially 1:10 to 10:1 and the preferred concentration of the mixture in the aqueous phase is 0.02% to 6% more especially 0.5% to 4% by weight.

The following examples illustrate the invention.

In the Examples the crude Chinese glucomannan contains about 50% of pure glucomannan and the Japanese refined glucomannan contains 70 to 75% pure glucomannan.

EXAMPLE ONE

A meat mixture having a pH of 6.8 was prepared to the following recipe:

| Ingredient | % |
| --- | --- |
| Minced Meat Offal | 70 |
| Water | 27 |
| Japanese Refined Glucomman | 1 |
| Xanthan Gum (Keltrol TM) | 1 |
| Potassium Chloride | 0.5 |
| Sodium Tripolyphosphate | 0.5 |

The glucomannan gum was dispersed in water and allowed to stand for ten minutes to aid hydration of the gum. The other ingredients were then added and the whole mix was raised in temperature to 90° C. over a period of 15 minutes whilst continually being stirred. The mixture was filled into tall cans which were then seamed. The cans were sterilised in a pressure cooker at 130° C. for 60 minutes, before being cooled to ambient temperature in running water.

The can contents, which were found to consist of a single, uniformly fine textured, strong elastic piece of meat-like material shaped by the can, was cut into ¾ inch chunks. Two experiments were carried out on the chunks.

1. The chunks were then added to a commercial meat-in-jelly pet food mixture at a level of 10% of the mixture which was then canned and sterilised at 130° C. for 60 minutes. The cans were cooled, opened and the contents examined. The meat chunks had retained their original shape, demonstrating heat irreversibility, and had an elastic, springy texture and appearance similar to that of cooked heart.
2. The chunks were placed in a can with tap water at a ratio of 20% pieces to 80% water. The cans were seamed and sterilised at 130° C. for one hour. After cooling the cans were opened and the contents examined. The chunks had retained their original cut shape confirming heat irreversibility, and had a firm, elastic texture similar to that of cooked meat offal.

EXAMPLE TWO

A meat mixture having a pH of 6.7 was prepared according to the following recipe:

| Ingredient | % |
| --- | --- |
| Minced Meat Offal | 50 |
| Tap Water | 45.7 |
| Crude Glucomannan (Konjac) of Chinese origin | 1.5 |

-continued

| Ingredient | % |
| --- | --- |
| Xanthan Gum (Keltrol TM) | 0.5 |
| Agar Technical grade (Oxoid) | 0.5 |
| Potassium Chloride | 0.5 |
| Sodium Tripolyphosphate | 0.5 |
| Caramel Solution | 0.6 |
| Erythrosine Solution | 0.2 |

The meat mixture was prepared and sterilised as described in Example One. The formed meat was cut into chunks and tested using the two experiments described in Example One. Both experiments demonstrated the heat irreversibility of the chunks. However the chunks had a firmer texture than those of Example One and were akin to cooked liver in texture and appearance.

EXAMPLE THREE

| Ingredients | % |
| --- | --- |
| Minced Meat Offal | 50 |
| Crude Glucomannan (Konjac) of Chinese origin | 1.2 |
| Xanthan Gum (Keltrol TM) | 0.33 |
| Carrageenan from Eucheuma Cottonnii | 0.66 |
| Water | 46 |
| Potassium Chloride | 0.5 |
| Sodium Tripolyphosphate | 0.5 |
| Caramel Solution | 0.6 |
| Erythrosine Solution | 0.2 |

The mixture which had a pH of 6.7 was prepared, sterilised and tested by the two experiments described in Example One. Both experiments demonstrated the heat irreversibility of the chunks. However the chunks had a softer, more elastic texture similar to that of lung.

EXAMPLE FOUR

A beefburger mixture having a pH 6.5 was prepared according to the following recipe:

| Ingredient | % |
| --- | --- |
| Lean Beef | 20 |
| Fat Beef | 40 |
| Crude Glucomannan (Konjac) of Chinese origin. | 1.5 |
| Xanthan Gum | 0.4 |
| Agar Technical Grade (Oxoid) | 0.6 |
| Sodium Chloride | 1.0 |
| Water | 36.5 |

The glucomannan gum was dispersed in the water and allowed to hydrate for ten mimnutes. The other ingredients were then added and the mix was raised to 90° C. by heating with continuous mixing over a period of 15 minutes. The mixture was then filled into tall cans which were then seamed. The cans were sterilised in a pressure cooker at 115° C. for 110 minutes. After cooling the can contents were found to consist of a firm uniformly textured piece of meat like material with no fat separation evident.

Beefburger sized pieces were cut from this piece and fried in fat in a pan for ten minutes. They were found to have a good beefburger like bite and texture, were moist and juicy with a good flavour. Canning provides a convenient means of storing the 'beefburgers' until required for use.

EXAMPLE FIVE

An apple puree having a pH of 6.8 was prepared by macerating the flesh of Cox's Orange Pippin apples in a Kenwood blender.

This was then used in the following recipe:

| Ingredient | % |
| --- | --- |
| Apple Puree | 64 |
| Japanese Refined Glucomannan | 1 |
| Low Acetyl Gellan TM Gum | 0.5 |
| Xanthan Gum (Keltrol TM) | 0.5 |
| Sodium Tripolyphosphate | 1.6 |
| Sucrose | 6 |
| Water | 26.4 |

The glucomannan gum was dispersed in the water and allowed to hydrate for ten minutes. The other ingredients were added and the mix raised to 90° C. by heating with continuous mixing over a period of 15 minutes. The mixture was then filled into handy sized cans which were then seamed. The cans were sterilised in a pressure cooker at 115° C. for 90 minutes.

After cooling the contents were found to consist of a firm uniformly textured piece of apple like material.

This was cut into ¾ inch size pieces and canned in a light sugar syrup. After sterilisation and cooling the cans were opened and the contents examined. The apple pieces had retained their original cut shape, confirming heat irreversibility and had a firm texture similar to that of cooked whole apple pieces.

What we claim is:

1. A method for making a thermo-irreversible aqueous gel, which comprises subjecting a gellable combination of xanthan gum and a glucomannan gum at a pH above 6.5 to a heat treatment under conditions of temperature and time to form a gel and to cause the gel to become thermo irreversible.

2. A method according to claim 1 wherein the pH is between 6.5 and 10.

3. A method according to claim 1 wherein the pH is between 6.5 and 8.

4. A method according to claim 1 wherein the gel also includes food materials.

5. A method according to claim 4 wherein the food materials comprise meat, fruit, or vegetable material.

6. A method according to claim 1 wherein the gel also includes other gums and/or gelling agents.

7. A method according to claim 6 wherein the gel includes agar, carrageenan, pectin, alginate, gellan or guar gum.

8. A method according to claim 1 wherein the ratio of xanthan gum to glucomannan gum is in the ratio of from 5:95 to 95:5.

9. A method according to claim 8 wherein the ratio of xanthan gum to glucomannan gum is in the range 1:10 to 10:1.

10. A method according to claim 1 wherein the concentration of xanthan gum and glucomannan gum in the aqueous phase is from 0.02% to 6%, by weight of the gel.

11. A method according to claim 10 wherein the concentration of xanthan gum and glucomannan in the aqueous phase is from 0.5% to 4%, by weight.

12. A method according to claim 1 wherein the glucomannan is a glucomannan from the corms of Amorphophallus species.

13. A thermo-irreversible gel from xanthan gum and a glucomannan gum.

* * * * *